United States Patent
Ishihara et al.

(10) Patent No.: US 10,695,912 B2
(45) Date of Patent: Jun. 30, 2020

(54) ACTUATION SYSTEM AND COMPUTER PROGRAM PRODUCT UTILIZING VISUAL SERVO CONTROL BASED ON IMAGES FROM MULTIPLE CAMERAS

(71) Applicant: Kabushiki Kaisha Toshiba, Minato-ku (JP)

(72) Inventors: Yoshiyuki Ishihara, Kawasaki (JP); Nobukatsu Sugiyama, Kawasaki (JP); Junji Oaki, Kawasaki (JP); Akihito Ogawa, Fujisawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 50 days.

(21) Appl. No.: 15/911,220

(22) Filed: Mar. 5, 2018

(65) Prior Publication Data
US 2019/0143525 A1    May 16, 2019

(30) Foreign Application Priority Data

Nov. 16, 2017    (JP) ................... 2017-221300

(51) Int. Cl.
| | | |
|---|---|---|
| B25J 9/02 | (2006.01) | |
| B25J 9/16 | (2006.01) | |
| G06K 9/32 | (2006.01) | |
| G05B 19/00 | (2006.01) | |

(52) U.S. Cl.
CPC ........... *B25J 9/1697* (2013.01); *B25J 9/1612* (2013.01); *G05B 19/00* (2013.01); *G06K 9/3216* (2013.01); *G06K 2009/3225* (2013.01)

(58) Field of Classification Search
None
See application file for complete search history.

(56) References Cited

U.S. PATENT DOCUMENTS

| | | | |
|---|---|---|---|
| 9,424,646 B2 | 8/2016 | Ikeda et al. | |
| 2013/0010081 A1* | 1/2013 | Tenney | A61B 34/30 348/47 |
| 2013/0238128 A1 | 9/2013 | Suzuki | |
| 2014/0067317 A1 | 3/2014 | Kobayashi et al. | |
| 2014/0301632 A1* | 10/2014 | Ikeda | G06T 7/0004 382/152 |
| 2016/0096270 A1* | 4/2016 | Ibarz Gabardos | B25J 9/163 700/253 |
| 2017/0287166 A1* | 10/2017 | Claveau | G06T 7/80 |

FOREIGN PATENT DOCUMENTS

| | | |
|---|---|---|
| JP | 2013-186088 | 9/2013 |
| JP | 2014-46433 | 3/2014 |
| JP | 2015-003348 | 1/2015 |
| JP | 2017-094482 | 6/2017 |
| JP | 6167622 | 7/2017 |

* cited by examiner

*Primary Examiner* — Bernard G Lindsay
(74) *Attorney, Agent, or Firm* — Oblon, McClelland, Maier & Neustadt, L.L.P.

(57) ABSTRACT

According to an embodiment, an actuation system includes a movable member, an actuator, at least one image taking unit, a coordinate conversion unit and a first actuation control unit. The actuator moves the movable member. The coordinate conversion unit performs coordinate conversion from an image-taking coordinate system of a taken image taken by the image taking unit to an arithmetic coordinate system for performing comparison. The first actuation control unit controls the actuator to reduce a deviation according to visual servo in the arithmetic coordinate system.

6 Claims, 9 Drawing Sheets

ACTUATION SYSTEM AND COMPUTER PROGRAM PRODUCT UTILIZING VISUAL SERVO CONTROL BASED ON IMAGES FROM MULTIPLE CAMERAS

CROSS-REFERENCE TO RELATED APPLICATIONS

This application is based upon and claims the benefit of priority from Japanese Patent Application No. 2017-221300, filed on Nov. 16, 2017; the entire contents of which are incorporated herein by reference.

FIELD

Embodiments described herein relate generally to an actuation system and a computer program product.

BACKGROUND

Conventionally, there is known an actuation system that executes feedback control according to visual servo.

For example, it is beneficial if an actuation system having a novel configuration with less inconveniences can be obtained.

DETAILED DESCRIPTION

According to an embodiment, an actuation system includes a movable member, an actuator, at least one image taking unit, a coordinate conversion unit and a first actuation control unit. The actuator moves the movable member. The coordinate conversion unit performs coordinate conversion from an image-taking coordinate system of a taken image taken by the image taking unit to an arithmetic coordinate system for performing comparison. The first actuation control unit controls the actuator to reduce a deviation according to visual servo in the arithmetic coordinate system.

Exemplary embodiments of an actuation system will be described below. Configurations and control (technical features) in the following embodiments, and actions and results (effects) derived by the configurations and control are only examples.

The following embodiments include identical constituent elements. Such identical constituent elements are denoted by identical reference signs and redundant explanations thereof may be omitted in some cases. In the present specification, ordinal numbers are conveniently provided to distinguish constituent elements and the like and the numbers do not indicate the priority or order thereof.

First Embodiment

Figure 1:
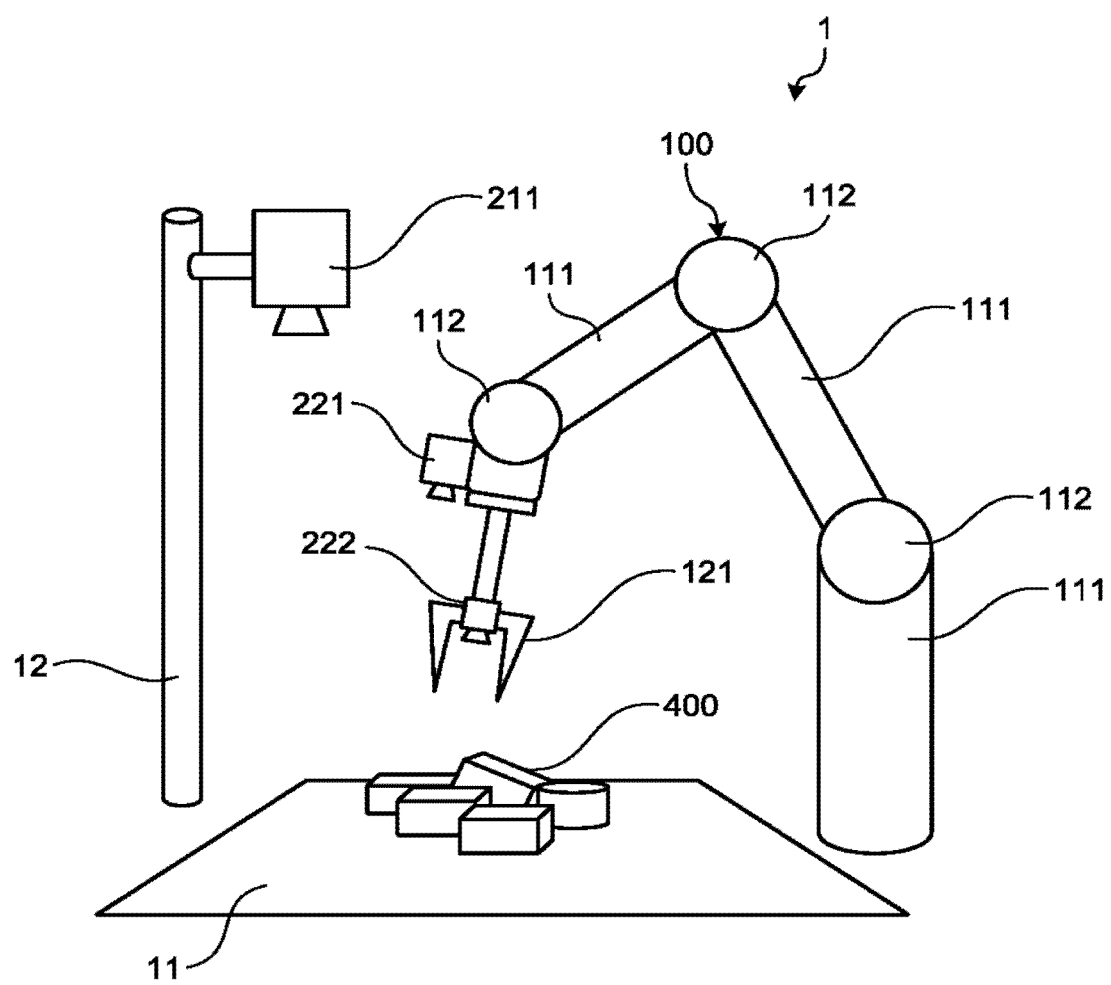
FIG. 1 is a schematic configuration diagram schematically and exemplarily illustrating an actuation system according to a first embodiment.

FIG. 1 is a schematic configuration diagram of an actuation system 1. As illustrated in FIG. 1, the actuation system 1 includes an actuation device 100.

The actuation device 100 is an articulated robot and has a plurality of arms 111 coupled to each other via articulations 112. The arms 111 are coupled in series. A hand 121 is provided at a distal end of the arms 111 via an articulation 112. The arms 111 and the hand 121 are examples of a movable member. The hand 121 can be referred to as "manipulator", "accessing unit", "processing unit", or the like. Positions and attitudes of the arms 111 and the hand 121 can be changed or maintained by actuation of an actuator 113 (see FIG. 2). The actuator 113 is, for example, a motor, a pump including a motor, a solenoid, or an electromagnetic valve including a solenoid although not limited thereto. The hand 121 is, for example, a vacuum chuck or a gripper although not limited thereto.

Processing objects 400 to be processed by the actuation device 100 are placed on a field 11 (an area or a stage). In the present embodiment, processing by the actuation device 100 is grasping the processing objects 400 with the hand 121 and conveying the processing objects 400 to a predetermined position.

The actuation system 1 controls the actuator 113 (see FIG. 2) to cause the hand 121 to have an attitude (a target attitude) appropriate for processing the processing objects 400 at a position (a target position) appropriate for processing the processing objects 400 under visual servo control based on images taken by a plurality of cameras 211, 221, and 222 so as to enable the processing by the actuation device 100 to be performed more reliably or more smoothly. The actuation system 1 controls the actuator 113 to cause the hand 121 to perform predetermined processing at a time point when the hand 121 has reached the target position and has the target attitude. The cameras 211, 221, and 222 are examples of an image taking unit. The cameras 211, 221, and 222 include optical system components. It suffices that the image taking unit includes at least an image sensor that can acquire image data. The actuation system 1 is also referred to as "robot handling system", "object following system", or "visual-servo actuation system".

The camera 211 being a bird's eye view camera supported on a stand 12 is fixed toward the field 11 and can take images of a wider range than other cameras 221 and 222. The bird's eye view camera 211 is an example of a wide-range image taking unit. The bird's eye view camera 211 is also referred to as "fixed camera". The distance of the bird's eye view camera 211 from the processing objects 400 is longer than those of other cameras 221 and 222 and the focal length of the bird's eye view camera 1 is shorter than those of other cameras 221 and 222. The angle of view of the bird's eye view camera 211 is wider than those of other cameras 221 and 222. The bird's eye view camera 211 includes, for example, a three-dimensional distance image sensor. The bird's eye view camera 211 does not always need to be fixed toward the field 11.

The cameras 221 and 222 provided on the actuation device 100 move with the actuation device 100. The cameras 221 and 222 are examples of a movable image taking unit. The distance of the first camera 221 from the processing objects 400 is longer than that of the second camera 222 and the focal length of the first camera 221 is shorter than that of the second camera 222. The angle of view of the first camera 221 is wider than that of the second camera 222. Each of the cameras 221 and 222 includes, for example, a two-dimensional image sensor. The first camera 2 an example of a first image taking unit and the second camera 222 is an example of a second image taking unit.

Figure 2:
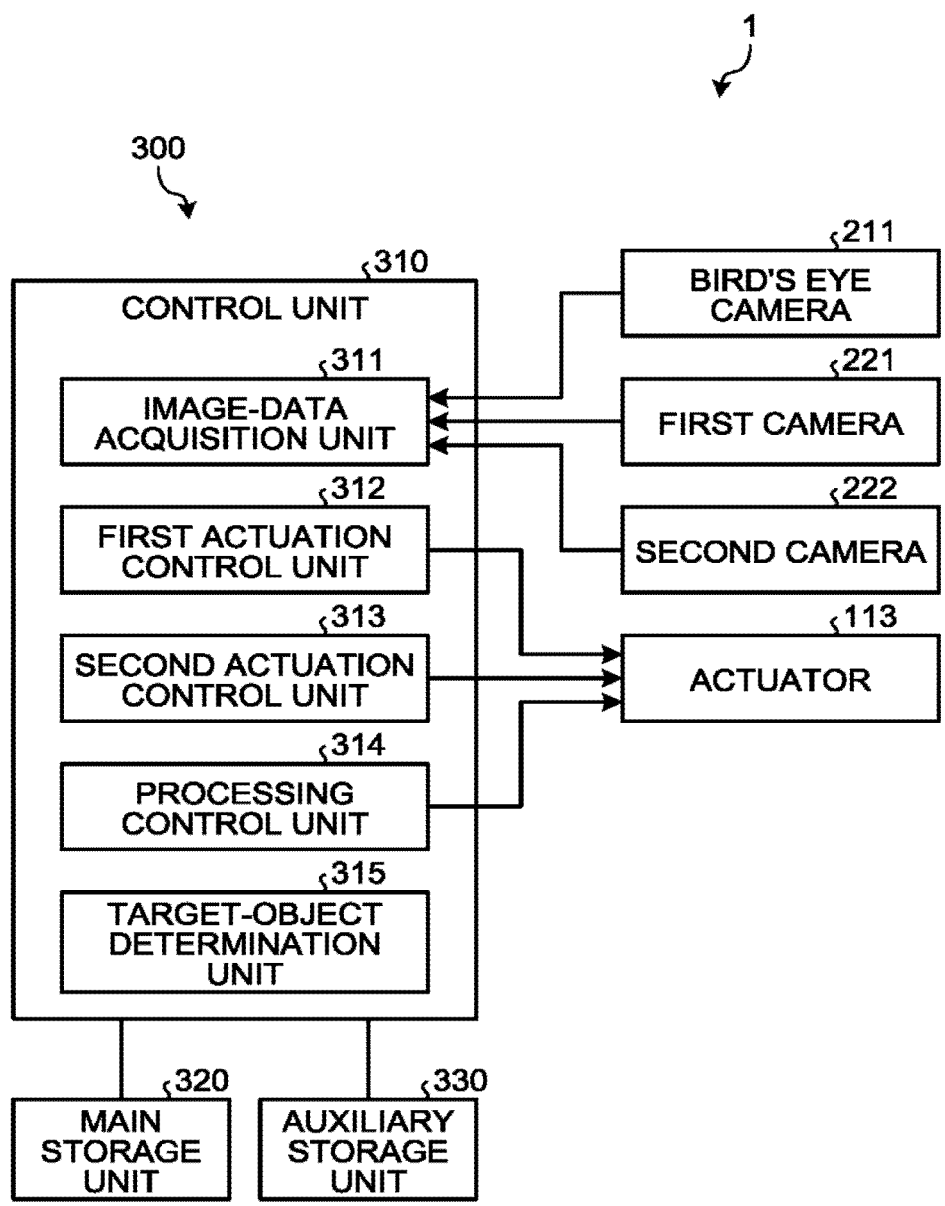
FIG. 2 is a block diagram schematically and exemplarily illustrating the actuation system according to the first embodiment.

FIG. 2 is a block diagram of the actuation system 1. The actuation system 1 includes a control device 300. The control device 300 includes a control unit 310, a main storage unit 320, an auxiliary storage unit 330, and the like. The control unit 310 is, for example, a central processing unit (CPU) or a controller, and the main storage unit 320 is, for example, a read only memory (ROM) or a random access memory (RAM).

Arithmetic processing and control of the control unit 310 can be executed by software or can be executed by hardware. The arithmetic processing and control of the control unit 310 can include arithmetic processing and control by software and arithmetic processing and control by hardware. In the case of processing by software, the control unit 310 reads programs (applications) stored in a ROM, a hard disk drive (HDD), a solid-state drive (SSD), a flash memory, or the like and executes the read programs (applications). The control unit 310 operates in accordance with the programs to function as respective units included in the control unit 310, that is, an image-data acquisition unit 311, a first actuation control unit 312, a second actuation control unit 313, a processing control unit 314, a target-object determination unit 315, and the like. In this case, the programs include modules corresponding to the units described above, respectively.

The programs can be provided in files of an installable format or an executable format, respectively, being recorded in a computer-readable recording medium such as a compact disc read only memory (CD-ROM), a floppy disk (FD), a compact disc-recordable (CD-R), a digital versatile disc (DVD), or a universal serial bus (USB) memory. The programs can be loaded by being stored in a storage unit of a computer connected to a communication network and downloaded via the network. The programs can be previously incorporated into a ROM or the like.

When a part or the entirety of the control unit 310 is constituted of hardware, the control unit 310 can include, for example, a field programmable gate array (FPGA) or an application specific integrated circuit (ASIC).

The image-data acquisition unit 311 acquires KGB image data (taken images) from the bird's eye view camera 211, the first camera 221, and the second camera 222. When the bird's eye view camera 211 includes a three-dimensional distance image sensor, data acquired by the image-data acquisition unit 311 includes, for example, data indicating the distance (position) from the bird's eye view camera 211 at each pixel position. The three-dimensional distance image data of the bird's eye view camera 211 can also be referred to as "three-dimensional point group data" or "three-dimensional point group image data".

The second actuation control unit 313 controls the actuator 113 to move the hand 121 from an initial position P0 to an intermediate position P10 based on the taken image of the bird's eye view camera 211. The intermediate position P10 is an example of a proximal position closer to a target object 401 than the initial position P0.

The second actuation control unit 313 controls the actuator 113 to move the hand 121 from an initial position P0 to an intermediate portion P10 based on the taken image of the bird's eye view camera 211. The intermediate position P10 is an example of a proximal position closer to a target object 401 than the initial position P0.

The processing control unit 314 controls the actuator 113 to cause the actuation device 100 (the hand 121) to perform predetermined processing in a state where the hand 121 has reached the target position and has the target attitude.

The target-object determination unit 315 determines the target object 401 (see FIG. 4) from the taken image of the bird's eye view camera 211.

Figure 3:
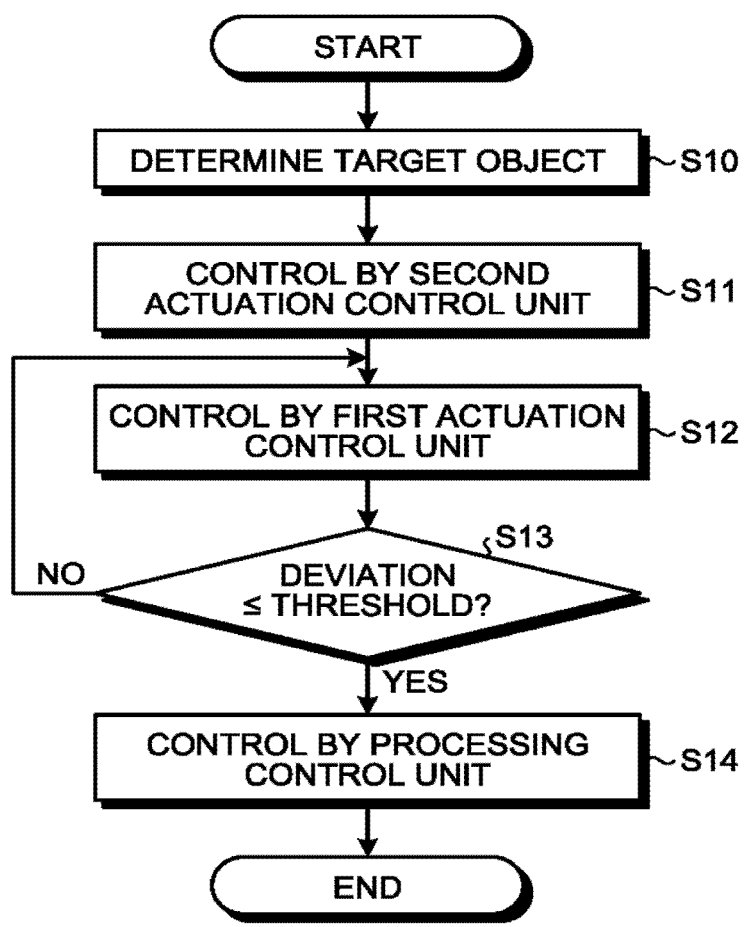
FIG. 3 is a flowchart schematically and exemplarily illustrating a procedure of processing performed by the actuation system according to the first embodiment.

FIG. 3 is a flowchart illustrating a procedure of processing performed by the control device 300. As illustrated in FIG. 3, the target object 401 is first determined by the target-object determination unit 315 (S10), control by the second actuation control unit 313 is executed (S11), and then, control by the first actuation control unit 312 is executed subsequently (S12). At each time step, comparison between a deviation of the position and attitude and a threshold of the deviation based on image information is performed (S13). When the deviation is equal to or smaller than the threshold at S13 (YES at 313), control by the processing control unit 314 is executed 14). When the deviation is larger than the threshold at S13 (NO at S13), the control by the first actuation control unit 312 is executed again (S12).

Figure 4:
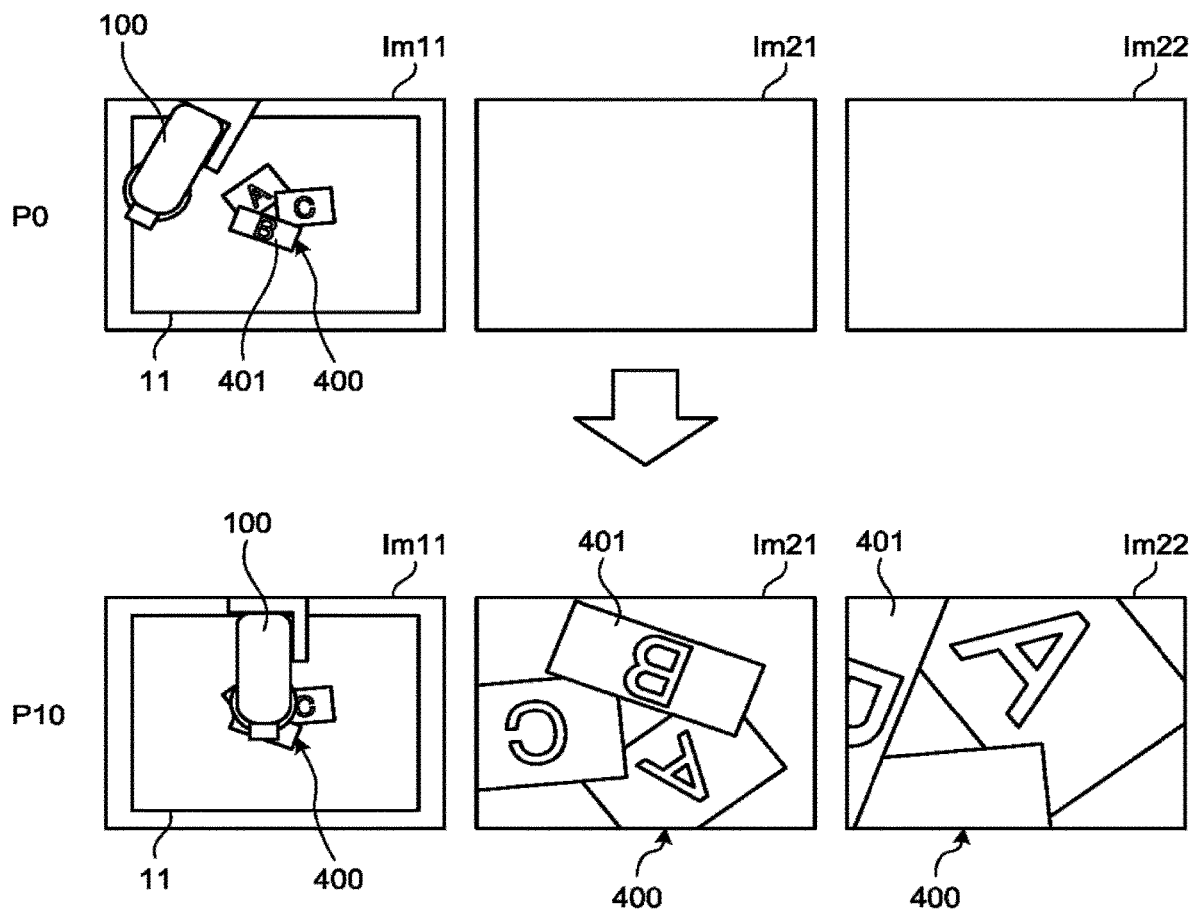
FIG. 4 is an explanatory diagram exemplarily and schematically illustrating changes of images taken by respective cameras associated with execution of control by a second actuation control unit according to the first embodiment.

FIG. 4 is an explanatory diagram illustrating changes of images taken by the cameras 211, 221, and 222 associated with execution of the control by the second actuation control unit 313. Images Im11 are images taken by the bird's eye view camera 211, images Im21 are images taken by the first camera 221, and images Im22 are images taken by the second camera 222. The upper portion of FIG. 4 represents images taken at the initial position P0 of the hand 121. The lower portion of FIG. 4 represents images taken at the intermediate position P10 of the hand 121.

The target-object determination unit 315 specifies or determines the target object 401 as a current processing object from a plurality of processing objects 400 based on the images Im11 of the bird's eye view camera 211. Specifically, the target-object determination unit 315 can determine, for example, a processing object 400 located at the topmost position among a plurality of stacked processing objects 400 as the target object 401 based on the three-dimensional distance image data acquired by the bird's eye view camera 211 in a state where the hand 121 is located at the initial position P0. When the bird's eye view camera 211 is positioned above the field 11 and is placed to take an image of a lower side, the target-object determination unit 315 can determine a processing object 400 located nearest to the bird's eye view camera 211 as the target object 401. By this control, a processing object 400 that is at the topmost position among the stacked processing objects 400 and that is unlikely to be obstructed by other processing objects 400 in processing can be determined as the target object 401.

The target-object determination unit 315 can determine, for example, a processing object 400 the image of which is located within a bounding box set in the two-dimensional images Im11 taken by the bird's eye view camera 211 among the processing objects 400 as the target object 401. Alternatively, the target-object determination unit 315 can determine the target object 401 by a known image processing method for the images Im11 taken by the bird's eye view camera 211.

As illustrated in the upper portion of FIG. 4, while the image of the processing objects 400 is included in the image Im11 taken by the bird's eye view camera 211 at the initial position P0 of the hand 121, the image of the processing objects 400 is not included in the image Im21 taken by the first camera 221 and the image Im22 taken by the second camera 222. There are various reasons for this, such as that the processing objects 400 are not within the angles of view of the cameras 221 and 222, that the processing objects 400 are not located in a range in which the cameras 221 and 222 come into focus, and that the processing objects 400 are located in a blind area of the actuation device 100 such as the arms 111 and the hand 121 for the cameras 221 and 222.

In contrast thereto, as illustrated in the lower portion of FIG. 4, the image of the target object 401 is included in the image Im21 taken by the first camera 221 and the image Im22 taken by the second camera 222 at the intermediate position P10 of the hand 121. In other words, the intermediate position P10 is a position where the image of the target object 401 is included in at least one of the image Im21 and the image Im22. At the intermediate position P10, the entire image of the target object 401 can be included in at least one of the image Im21 and the image Im22.

That is, the second actuation control unit 313 controls the actuator 113 to move the hand 121 from the initial position P0 to the intermediate position P10 in which the target object 401 (the processing object 400) is included in at least one of the images Im21 and Im22 taken by the cameras 21 and 222, respectively. The intermediate position P10 is also referred to as "initial position" or "pre-control position" of control according to visual servo by the first actuation control unit 312.

Figure 5:
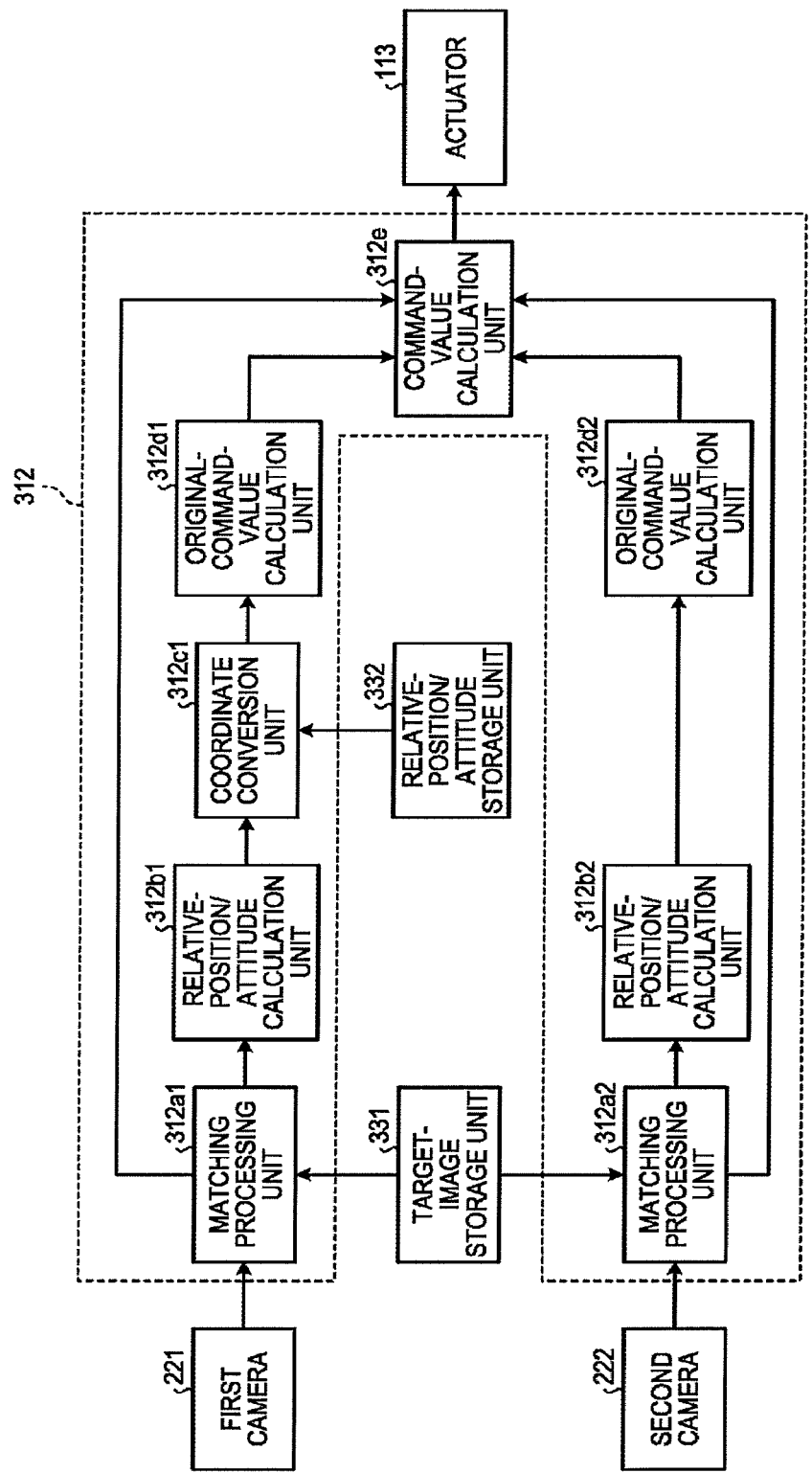
FIG. 5 is a block diagram schematically and exemplarily illustrating a first actuation control unit according to the first embodiment.

FIG. 5 is a block diagram of the first actuation control unit 312. The first actuation control unit 312 controls the actuator 113 to move the hand 121 from the intermediate position P10 to the target position and to cause the hand 121 to have the target attitude at the target position by feedback control according to visual servo based on comparison between (a parameter based on) the image taken by the first camera 221 and the image taken by the second camera 222 and (a parameter based on) the target image.

As illustrated in FIG. 5, the first actuation control unit 312 includes matching processing units 312a1 and 312a2, relative-position/attitude calculation units 312b1 and 312b2, a coordinate conversion unit 312c1, original-command-value calculation units 312d1 and 312d2, and a command-value calculation unit 312e. The matching processing unit 312a1, the relative-position/attitude calculation unit 312b1, the coordinate conversion unit 312c1, and the original-command-value calculation unit 312d1 perform arithmetic processing for images taken by the first camera 221, and the matching processing unit 312a2, the relative-position/attitude calculation unit 312b2, and the original-command-value calculation unit 312d2 perform arithmetic processing for images taken by the second camera 222.

A target-image storage unit 331 has stored therein a target image for each of the processing objects 400. A target image is an image of the target object 401 in a state where the hand 121 is located with the target attitude at the target position or a predetermined relative position with respect to the target position. In other words, the target image is an image of the target object 401 in a state of being placed at a position and with an attitude suitable for performing processing by the hand 121. The target image is also referred to as "standard image", "reference image", or "master image". In the present embodiment, the target image is an image of the target object 401 taken by the second camera 222 as an example. The target-image storage unit 331 is, for example, a part of the auxiliary storage unit 330.

The matching processing unit 312a1 selects the target image of the target object 401 from the target images of the processing objects 400 stored in the target-image storage unit 331 and performs pattern matching based on feature point extraction between the image taken by the first camera 221 and the target image of the target object 401. The matching processing unit 312a2 also selects the target image of the target object 401 from the target images of the processing objects 400 stored in the target-image storage unit 331 and performs pattern matching based on feature point extraction between the image taken by the second camera 222 and the target image of the target object 401.

The relative-position/attitude calculation unit 312b1 calculates a relative attitude $R_m$ and a relative position $t_m$ of the target object 401 with respect to the first camera 221 based on a result of the pattern matching by the matching processing unit 312a1. The relative-position/attitude calculation unit 312b2 calculates a relative attitude $R_h$ and a relative position $t_h$ of the target object 401 with respect to the second camera 222 based on a result of the pattern matching by the matching processing unit 312a2. A method of estimating a known fundamental matrix and decomposing the matrix into an attitude and a position, a method of estimating a homography matrix and decomposing the matrix into an attitude and a position (in a case where a target image is a plane), or the like can be used for the calculation of a relative attitude and a relative position.

The coordinate conversion unit 312c1 performs processing of converting a relative attitude and a relative position in a first coordinate system $(x_m, y_m, z_m)$ of the first camera 221 into a relative attitude and a relative position in a second coordinate system $(x_h, y_h, z_h)$ of the second camera 222. That is, the coordinate conversion unit 312c1 converts data such as a vector of a relative position and a relative attitude obtained from the image Im21 taken by the first camera 221 into data such as a vector obtained from a virtual image taken by the second camera 222. In other words, from data such as a vector obtained based on the image Im21 taken by the first camera 221, the coordinate conversion unit 312c1 calculates virtual data such as a vector based on a virtual image (a first taken image) obtained when it is assumed that a subject or the like included as an image in the image Im21 is taken by the second camera 222 at the position and the attitude of the second camera 222 (that is, in an arithmetic coordinate system). The coordinate conversion unit 312c1 can alternatively obtain a virtual taken image by converting a taken image instead of data such as a vector. In this case, the taken image is data to be converted by the coordinate conversion unit 312c1. The coordinate conversion unit 312c1 is an example of a conversion unit. Information (such as R or t, described later) related to the relative position and the relative attitude used in the arithmetic processing by the coordinate conversion unit 312c1 is stored in the relative-position/attitude storage unit 332. The relative-position/attitude storage unit 332 is, for example, a part of the auxiliary storage unit 330.

Figure 6:
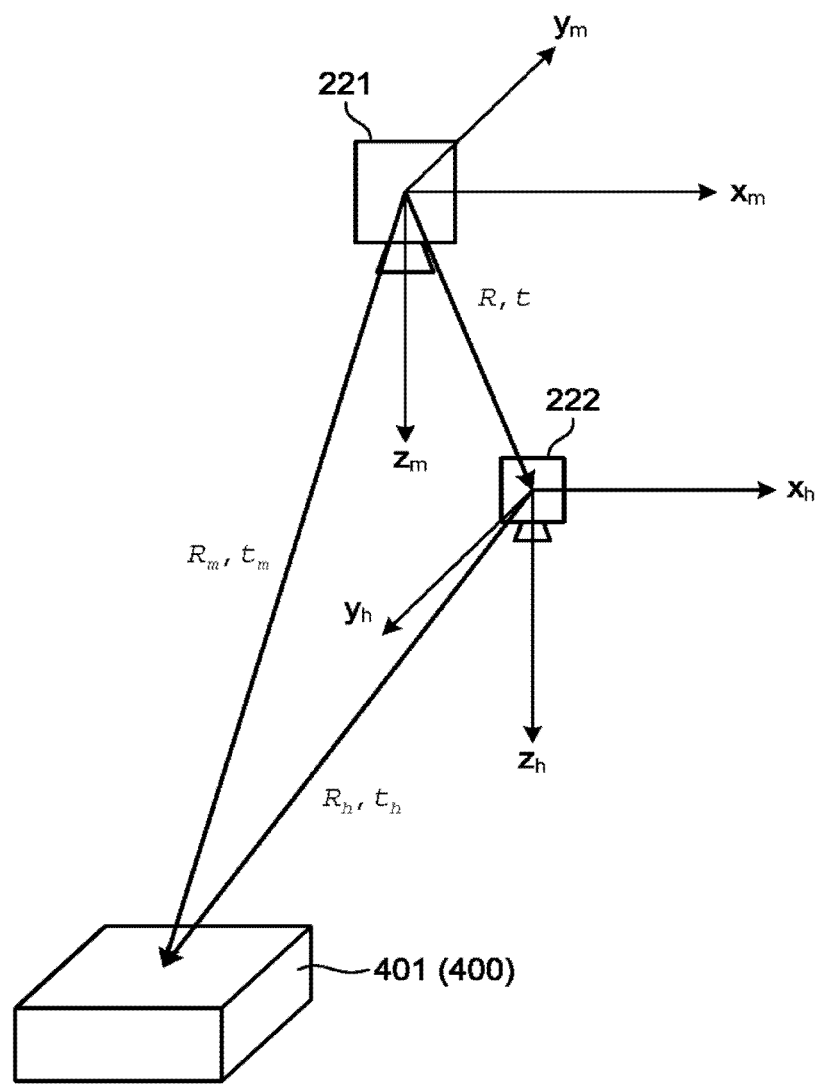
FIG. 6 is an explanatory diagram schematically and exemplarily illustrating a relation among vectors of relative attitudes and relative positions of a first camera, a second camera, and a target object in the actuation system according to the first embodiment.

FIG. 6 is an explanatory diagram illustrating a relation among vectors of relative attitudes and relative positions of the Brat camera 221, the second camera 222, and the target object 401 (the processing object 400). Coordinate conversion in the coordinate conversion unit 312c1 is described below with reference to FIG. 6.

Assuming the relative attitude of the second camera 222 with respect to the first camera 221 is R (a vector) and the relative position thereof is t (a vector), a homogeneous transformation matrix T of the relative attitude R and the relative position t from the first camera 221 to the second camera 222 is represented by a following expression (1).

$$T = \begin{bmatrix} R & t \\ 0 & 1 \end{bmatrix} \quad (1)$$

Although the relative attitude R and the relative position t are invariable (constant) in the present embodiment, it is possible to enable the relative attitude R and the relative position t to be detected in real-time and to cause the relative attitude R and the relative position t to variable.

Then visual servo control by a position-based method is executed, a homogeneous transformation matrix $T_m$ of a relative attitude $R_m$ and a relative position $t_m$ from the first camera 221 to the target object 401 and a homogeneous transformation matrix $T_h$ of a relative attitude $R_h$ and a relative position $t_h$ from the second camera 222 to the target object 401 are represented by following expressions (2) and (3), respectively, in view of stereopsis.

$$T_m = \begin{bmatrix} R_m & t_m \\ 0 & 1 \end{bmatrix} \quad (2)$$

$$T_h = \begin{bmatrix} R_h & t_h \\ 0 & 1 \end{bmatrix} \quad (3)$$

From FIG. 6, a following expression (4) holds among the homogeneous transformation matrices T, $T_m$, and $T_h$.

$$T_m = T T_h \quad (4)$$

Therefore, the homogeneous transformation matrix $T_h$ from the first coordinate system ($x_m$, $y_m$, $z_m$) of the first camera 221 to the second coordinate system ($x_h$, $y_h$, $z_h$) of the second camera 222 is represented as follows.

$$T_h = T^{-1} T_m \quad (5)$$

Because the relative positions $t_m$ and $t_h$ in the expressions and (3) are calculated based on the way of thinking of stereopsis, the scale is indeterminate when prior information (dimension or shape) of the target object 401 is unknown. That is, only ratios of the relative positions $t_m$ and $t_h$ in respective directions are known and the sizes (absolute amounts) are unknown. In contrast thereto, the size of the relative position t between two cameras is measurable. Therefore, a following expression (6) including an appropriate scaling constant α is practically used instead of the expression (5).

$$T_h = T^{-1} T_m = \begin{bmatrix} R & \alpha t \\ 0 & 1 \end{bmatrix}^{-1} \begin{bmatrix} R_m & t_m \\ 0 & 1 \end{bmatrix} = \begin{bmatrix} R^T R_m & R^T t_m - \alpha R^T t \\ 0 & 1 \end{bmatrix} \quad (6)$$

From the expression (6), coordinate conversions of the relative attitude $R_m$ and the relative position $t_m$ from the first coordinate system ($x_m$, $y_m$, $z_m$) to the second coordinate system ($x_h$, $y_h$, $z_h$) are represented by a following expression (7).

$$R_h' = R^T R_m$$

$$t_h' = R^T t_m - \alpha R^T t \quad (7)$$

Based on a relative attitude $R_h'$ and a relative position $t_h'$ coordinate-converted by the coordinate conversion unit 312c1, the original-command-value calculation unit 312d1 calculates an original command value $u_{h1}$ to reduce a deviation (the relative attitude $R_h'$ and the relative position $t_h'$) by a known method. In the original-command-value calculation unit 312d1, the first coordinate system ($x_m$ $y_m$, $z_m$) of the first camera 221 is an example of an image-taking coordinate system first image-taking coordinate system) of the first camera 221, and the second coordinate system ($x_h$, $y_h$, $z_h$) of the second camera 222 is an example of an arithmetic coordinate system for performing arithmetic processing of feedback control according to visual servo. The second coordinate system ($x_h$, $y_h$, $z_h$) of the second camera 222 is also an image-taking coordinate system (a second image-taking coordinate system) of the second camera 22. The relative attitude $R_h'$ and the relative position $t_h'$ are examples of first data.

Based on the relative attitude $R_h$ and the relative position $t_h$ obtained by the relative-position/attitude calculation unit 312b2, the original-command-value calculation unit 312d2 calculates an original command value $u_{h2}$ that reduces a deviation (the relative attitude $R_h$ and the relative position $t_h$) by a known method. The relative attitude $R_h$ and the relative position $t_h$ are examples of second data.

The command-value calculation unit 312e calculates a command value u based on the original command value $u_{h1}$ calculated by the original-command-value calculation unit 312d1 and the original command value $u_{h2}$ calculated by the original-command-value calculation unit 312d2.

The command-value calculation unit 312e can calculate the command value u by a following expression (8), for example.

$$u = k \cdot u_{h1} + (1-k) u_{h2} \quad (8)$$

In this expression (8), k is a weighting coefficient.

The weighting coefficient k can be determined according to the number of feature points matched in each of the matching processing units 312a1 and 312a2. For example, when the number of feature points matched in the matching processing unit 312a1 is $m_1$ and the number of feature points matched in the matching processing unit 312a2 is $m_2$, the weighting coefficient k can be determined by a following expression (9).

$$k = m_1 / (m_1 + m_2) \quad (9)$$

In another example, when the image taken by the second camera s not include the image of the target object 401, the weighting coefficient k can be set to 1. In this case, the command value u is determined based only on the image (the image Im21) taken by the first camera 221.

In still another example, when the deviation becomes equal to or smaller than the threshold, the weighting coefficient k can be set to 0 (zero). In this case, the command value u is determined based only on the image (the image Im22) taken by the second camera 222. In this case, a condition in which the deviation becomes equal to or smaller than the threshold can be replaced by various other conditions such as a condition in which the distance between the second camera 222 and the target object 401, which is separately detected by a sensor or the like, becomes equal to or smaller than a threshold, a condition in which the distance between the second camera 222 and the surface of the field 11 becomes equal to or smaller than a threshold, and a condition in which the size of the target object 401 in the image taken by the second camera 222 becomes equal to or larger than a threshold.

Figure 7:
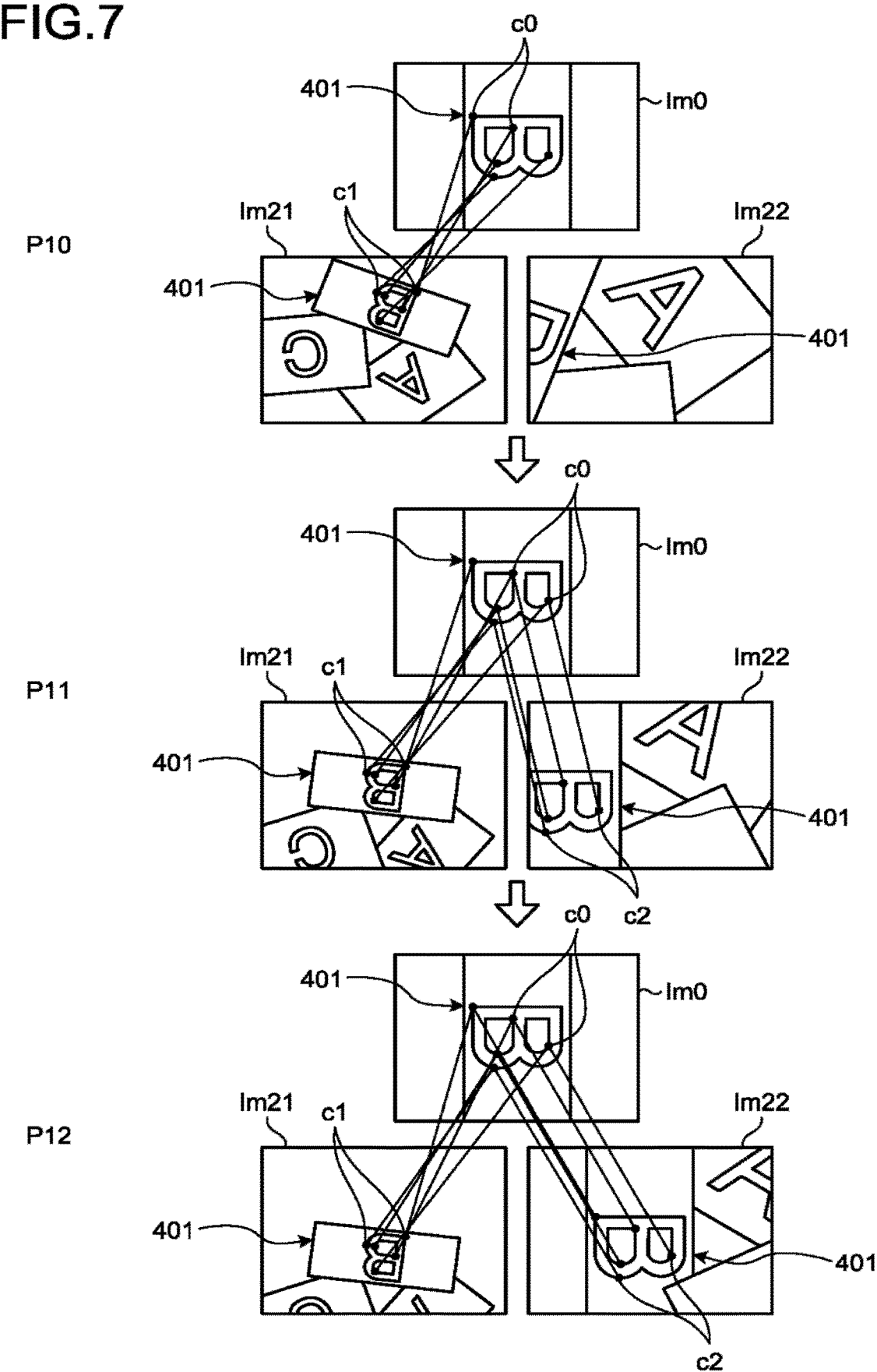
FIG. 7 is an explanatory diagram exemplarily and schematically illustrating changes of images taken by respective cameras associated with execution of control by a first actuation control unit according to the first embodiment.

FIG. 7 is an explanatory diagram illustrating changes of the image Im21 taken by the first camera 221 and the image Im22 taken by the second camera 222 according to changes of the position of the hand 121 associated with execution of visual servo control. An image Im0 is a target image stored in the target-image storage unit 331, the image Im21 is an image taken by the first camera 221, and the image Im22 is an image taken by the second camera 222. An upper portion of FIG. 7 represents a state where the hand 121 is located at the intermediate position P10 described above, a middle portion of FIG. 7 represents a state where the hand 121 is located at a position P11 closer to the target position than the intermediate position P10, and a lower portion of FIG. 7 represents a state where the hand 121 is located at a position P12 closer to the target position than the position P11. The position P12 is a position in a state where the hand 121 has almost reached the target position.

In the state where the hand 121 is located at the intermediate position P10, only a part of the image of the target object 401 is included in the image Im22 taken by the second camera 222. Therefore, no feature points matched with the image Im0 are extracted from the image Im22. On the other hand, the image Im21 taken by the first camera 221 includes the image of the target object 401 and feature points c1 matched with feature points c0 of the image Im0 are extracted from the image Im21. In this case, the original-command-value calculation unit 312d1 calculates the original command value $u_{h1}$ from the relative attitude $R_h'$ and the relative position $t_h'$ obtained by the coordinate conversion in the coordinate conversion unit 312c1. In this case, the weighting coefficient k in the calculation of the command value u by the command-value calculation unit 312e using the expression (8) is set to 1 (k=1) according to the expression (9), and thus the command value a becomes the original command value $u_{h1}$.

In the state where the hand 121 is located at the position P11 closer to the target object 401 than the intermediate position P10, the feature points c1 and c2 matched with the feature points c0 of the image Im0 are extracted from both the image Im21 and the image Im22. In this case, the weighting coefficient k in the command-value calculation unit 312e is set in accordance with the expression (9) and the original command values $u_{h1}$ and $u_{h2}$ are weighted according to the ratio of the numbers of the feature points c1 and c2 to calculate the command value u according to the expression (8).

Also in the state where the hand 121 is located at the position P12 closer to the target object 401 than the position P11, the feature points c1 and c2 matched with the feature points c0 of the image Im0 are extracted from both the image Im21 and the image Im22. Therefore, also in this case, the weighing coefficient k can be set in accordance with the expression (9). Alternatively, in a case where a condition such as the condition in which the deviation becomes equal to or smaller than the threshold, the condition in which the distance between the second camera 222 and the target object 401 becomes equal to or smaller than the threshold, the condition in which the distance between the second camera 222 and the surface of the field 11 becomes equal to or smaller than the threshold, or the condition in which the size of the target object 401 in the image taken by the second camera 222 becomes equal to or larger than the threshold is met, it is possible to calculate the command value u using only the image taken by the second camera 222 closer to the target object 401 out of the two cameras 221 and 222 and to set the weighing coefficient k to 0 (k=0) in the calculation of the command value a according to the expression (8) in the command-value calculation unit 312e. In this case, the command value u becomes the original command value $u_{h2}$ calculated by the original-command-value calculation unit 312d2 (u=$u_{h2}$). In this manner, the first actuation control unit 312 can control the actuator 113 based on at least one of the image Im21 and the image Im22, in other words, at least one of data such as a vector obtained from the image Im21 and data such as a vector obtained from the image Im22.

As described above, the first actuation control unit 312 of the present embodiment includes the coordinate conversion unit 312c1 that performs coordinate conversion from the first coordinate system (the image-taking coordinate system, the first image-taking coordinate system) of the first camera 221 to the second coordinate system (the arithmetic coordinate system, the second image-taking coordinate system) of the second camera 222. Accordingly, for example, when there is no taken image of the target object 401 in the second coordinate system, control according to visual servo can be executed in the second coordinate system based on a virtual value in the second coordinate system obtained by coordinate conversion from the taken image of the target object 401 in the first coordinate system. Therefore, according to the present embodiment, for example, a situation such as loss of control due to absence of a taken image is likely to be avoided. That is, according to the present embodiment, for example, the actuation system 1 having higher robustness is obtained. Furthermore, the present embodiment eliminates the need of strict calibration or teaching in the actuation system 1, for example.

The command-value calculation unit 312e of the present embodiment calculates the command value u in visual servo control based on taken images of the cameras 221 and 222 (the image taking units). Accordingly, for example, even in a case where there is no image taken by one of the cameras 221 and 222, the command value u can be calculated when there is an image taken by the other camera. Therefore, according to the present embodiment, for example, the actuation system 1 having higher robustness, the actuation system 1 having a damage tolerance, the actuation system 1 having a relatively-high control accuracy and being capable of more quickly reaching desired position and attitude, and the like can be obtained.

The command-value calculation unit 312e of the present embodiment calculates the command value as a weighted average of a plurality of original command values. Therefore, according to the present embodiment, for example, a command value reflecting the original command values obtained from respective taken images can be calculated promptly by relatively-simple arithmetic processing. For example, a change of the weighting coefficient according to presence or absence of the target object 401 in a taken image can provide the actuation system 1 having a relatively-high control accuracy and being capable of more quickly reaching desired position and attitude.

The weighting coefficient of the present embodiment is set to be larger as the number of feature points matched between taken images from which the original command values have been calculated and the target image is larger.

Therefore, according to the present embodiment, for example, the actuation system 1 having a relatively-high control accuracy and being capable of more quickly reaching desired position and attitude can be obtained.

The cameras 211, 221, and 222 (the image taking units) of the present embodiment include the cameras, 221, and 222 where at least one of the angles of view, the focal lengths, and the image taking directions is different from each other. Therefore, according to the present embodiment, for example, the actuation system 1 catching the target object 401 in a wider range and being capable of more quickly reaching desired position and attitude can be obtained.

The target-object determination unit 315 of the present embodiment determines the target object 401 based on an image taken by the bird's eye view camera 211 (the wide-range image taking unit) before control by the first actuation control unit 312. Therefore, according to the present embodiment, for example, the actuation system 1 determining the target object 401 more promptly or more reliably and being capable of more quickly reaching desired position and attitude can be obtained.

The target-object determination unit 315 of the present embodiment determines the target object 401 based on the three-dimensional distance image data obtained by the bird's eye view camera 211 (the wide-range image taking unit). Therefore, according to the present embodiment, the target object 401 that is unlikely to interfere with other processing objects 400 can be determined more promptly based on height information of the processing objects 400, for example.

The second actuation control unit 31 the present embodiment controls the actuator 113 to move the hand 121 (a movable member) to the intermediate position P10 (a proximal position) closer to the target object 401 before the control by the first actuation control unit 312 and after the determination of the target object 401 by the target-object determination unit 315. Therefore, according to the present embodiment, for example, control according to visual servo by the first actuation control unit 312 can be started more reliably or more smoothly and thus the actuation system 1 capable of more quickly reaching desired position and attitude can be obtained.

First Modification

Figure 8:
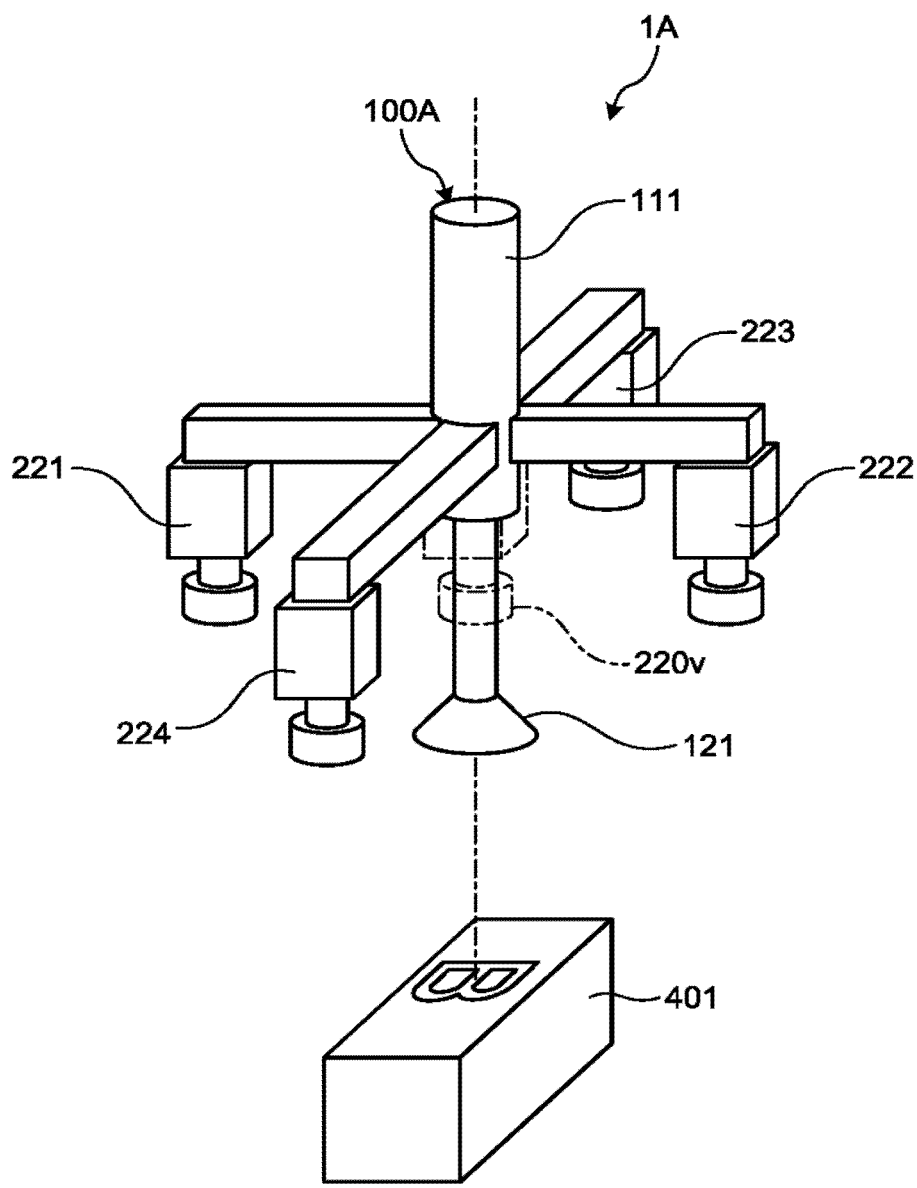
FIG. 8 is a perspective view schematically and exemplarily illustrating a distal end portion of an actuation device of an actuation system according to a first modification.

FIG. 8 is a perspective view of a distal end portion including the hand 121 of an actuation device 100A of an actuation system 1A according to a first modification. The present modification also has an identical configuration to that of the embodiment described above and can achieve identical actions and effects based on the identical configuration. However, in the present modification, virtual image-taking coordinate system of a virtual camera 220v placed at a position different from those of cameras 221 to 224 is set as an arithmetic coordinate system. In other words, in the present modification, the arithmetic coordinate system is set as a coordinate system different from the image-taking coordinate system. In this case, the first actuation control unit 312 performs coordinate conversion of values based on taken images of the respective cameras 221 to 224 into those in the virtual image-taking coordinate system of the virtual camera 220v and executes feedback control according to visual servo in the virtual image-taking coordinate system. The cameras 221 to 224 are placed to enable the target object 401 to be taken by at least any one of the cameras 22 to 224 in a state where the hand 121 is located at the target position and the target attitude. The hand 121 is, for example, a vacuum chuck although not limited thereto. The command-value calculation unit 312e can calculate the command value u by a following expression (10).

$$u = (m_a \cdot u_a + m_b \cdot u_b + m_c \cdot u_c + m_d \cdot u_d)/(m_a + m_b + m_c + m_d) \quad (10)$$

In this expression, $U_a$ to $U_d$ are original command values calculated froth the taken images of the cameras 221 to 224, respectively, and $m_a$ to $m_d$ are the numbers of feature points matched between the taken images of the cameras 221 to 224 and the target image, respectively. With this configuration, the arithmetic coordinate system of the virtual camera 220v can be set, for example, at a position where the hand 121 is provided as illustrated in FIG. 8. In other words, the virtual camera 220v can be placed at a position where the hand 121 is provided. According to the present modification, access of the hand 121 to the target object 401 may be performed more easily or more reliably.

Second Embodiment

Figure 9:
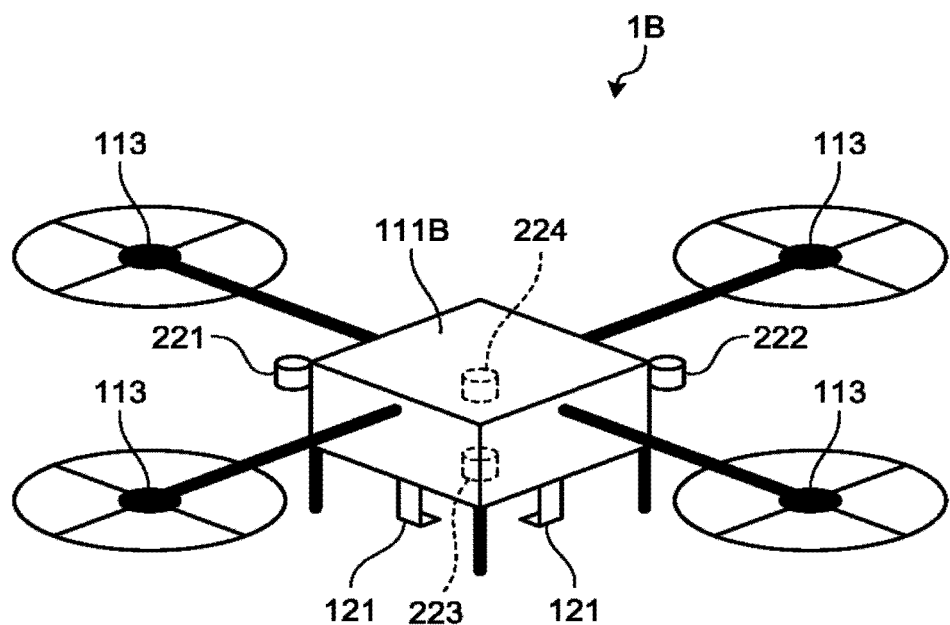
FIG. 9 is a perspective view schematically and exemplarily illustrating an actuation system according to a second embodiment.

FIG. 9 is a perspective view of an actuation system 1B (an actuation device) according to a second embodiment. The present embodiment also has an identical configuration to that of the first embodiment and the modification described above and can achieve identical actions and effects based on the identical configuration. However, in the second embodiment, the actuation system 1B is a flying object. A base 111B being a movable member is a body or a cabin that rises and moves with propellers, and the actuator 113 is a motor or the like that drives the propellers. The first actuation control unit 312 controls the position and attitude of the base 111B or the hand 121 by feedback control according to visual servo based on taken images of the cameras 221 to 224.

Configurations and shapers the embodiments can be partially changed. In addition, specifications (structure, type, direction, shape, size, length, width, thickness, height, angle, number, arrangement, position, material, and the like) of respective configurations, shapes, and the like can be appropriately changed.

For example, processing of the actuation device or the manipulator is not limited to grasp or conveyance of a processing object (a target object) and can be other processing for the processing object. It suffices that the deviation is a parameter indicating the relative attitude or the relative position obtained from an image of the target object in an image and the deviation is not limited to the relative attitude or the relative position itself. In the present embodiments, the first actuation control unit can execute visual servo control by a feature-amount based method and the deviation in this case is a deviation of image coordinate values of feature points. Alternatively, the first actuation control unit can perform predetermined arithmetic processing to data calculated from a taken image subjected to the coordinate conversion (conversion), instead of arithmetic processing to data obtained by performing coordinate conversion (conversion) of data such as a vector calculated from taken images.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An actuation system comprising:
a movable member;
an actuator that moves the movable member;
at least one image taking unit;
a coordinate conversion unit that performs coordinate conversion from an image-taking coordinate system of a taken image taken by the image taking unit to an arithmetic coordinate system for performing comparison; and
a first actuation control unit that controls the actuator to reduce a deviation according to visual servo in the arithmetic coordinate system, wherein
the at least one image taking unit includes a first image taking unit, a second image taking unit that are provided at different positions on the movable member,
the actuation system further comprises a wide-range image taking unit that is fixed at a different position from the first image taking unit and the second image taking unit so as to take an image of a wider range than the first image taking unit and the second image taking unit,
the first actuation control unit includes a command-value calculation unit that calculates a command value for the actuator based on the taken images of the first image taking unit and the second image taking unit,
the actuation system further comprises an original-command-value calculation unit that calculates a plurality of original command values based on the taken images the first image taking unit and the second image taking unit, and
the command-value calculation unit calculates the command value as a weighted average of the original command values calculated based on the taken images of the first image taking unit and the second image taking unit,
the actuation system further comprises a target-object determination unit that selects a target object based on a taken image by the wide-range image taking unit before control by the first actuation control unit, and
the actuation system further comprises a second actuation control unit that controls the actuator to move the movable member to a specific position based on a taken image by the wide-range image taking unit before control by the first actuation control unit and after determination of the target object by the target-object determination unit, the specific position being a position where an image of the target object is included in at least one of a taken image taken by the first image taking unit and a taken image taken by the second image taking unit.

2. The actuation system according to claim 1, wherein the arithmetic coordinate system is set to a second image-taking coordinate system of a taken image taken by the second image taking unit, and
the coordinate conversion unit performs coordinate conversion from a first image-taking coordinate system of a taken image taken by the first image taking unit to the second image-taking coordinate system.

3. The actuation system according to claim 1, wherein the first actuation control unit includes a matching processing unit that performs matching processing based on feature points between each of the taken images and a target image, and
a weighting coefficient for the original command values is set to be larger as number of the feature points matched between the taken images from which the original command values are calculated and the target image is larger.

4. The actuation system according to claim 1, wherein the first image taking unit and the second image taking unit are different from each other in at least one of an angle of view, a focal length, and an image taking direction.

5. The actuation system according to claim 1, wherein
the wide-range image taking unit acquires three-dimensional distance image data as a taken image, and
the target-object determination unit determines the target object based on the three-dimensional distance image data.

6. A computer program product comprising a non-transitory computer-readable medium including a computer program that causes a computer to function as:
a coordinate conversion unit that performs coordinate conversion from an image-taking coordinate system of a taken image taken by at least one image taking unit of an actuation system to an arithmetic coordinate system for performing comparison; and
a first actuation control unit that controls an actuator of the actuation system to reduce a deviation according to visual servo in the arithmetic coordinate system, the actuator moving a movable member of the actuation system, wherein
the at least one image taking unit includes a first image taking unit and a second image taking unit that are provided at different positions on the movable member,
the actuation system comprises a wide-range image taking unit that is fixed at a different position from the first image taking unit and the second image taking unit so as to take an image of a wider range than the first image taking unit and the second image taking unit,
the first actuation control unit includes a command-value calculation unit that calculates a command value for the actuator based on the taken images of the first image taking unit and the second image taking unit,
the computer program product having the non-transitory computer-readable medium including the computer program that causes the computer to further function as an original-command-value calculation unit that calculates a plurality of original command values based on the taken images of the first image taking unit and the second image taking unit, and
the command-value calculation unit calculates the command value as a weighted average of the original command values calculated based on the taken images of the first image taking unit and the second image taking unit,
the computer program that causes the computer to further function as a target-object determination unit that selects a target object based on a taken image by the wide-range image taking unit before control by the first actuation control unit, and
the actuation system further comprises a second actuation control unit that controls the actuator to move the movable member to a specific position based on a taken image by the wide-range image taking unit before control by the first actuation control unit and after determination of the target object by the target-object determination unit, the specific position being a position where an image of the target object is included in at least one of a taken image taken by the first image taking unit and a taken image taken by the second image taking unit.

* * * * *